E. C. DAVISON & E. M. SHERMAN.
COMPASS PROTRACTOR.
APPLICATION FILED JUNE 17, 1914.

1,161,625.

Patented Nov. 23, 1915.
2 SHEETS—SHEET 1.

Witnesses

Inventors
Eugene M. Sherman
Edwin C. Davison
By Stuart and Mason
Attorneys

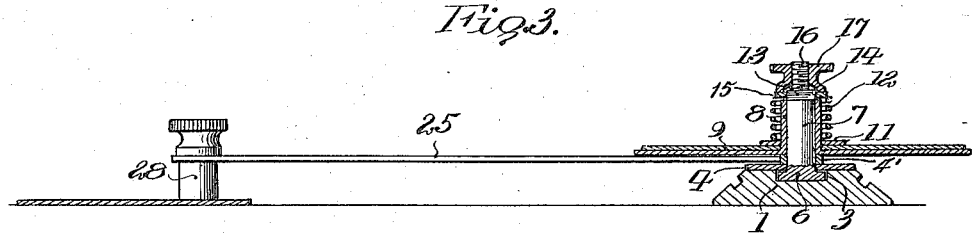
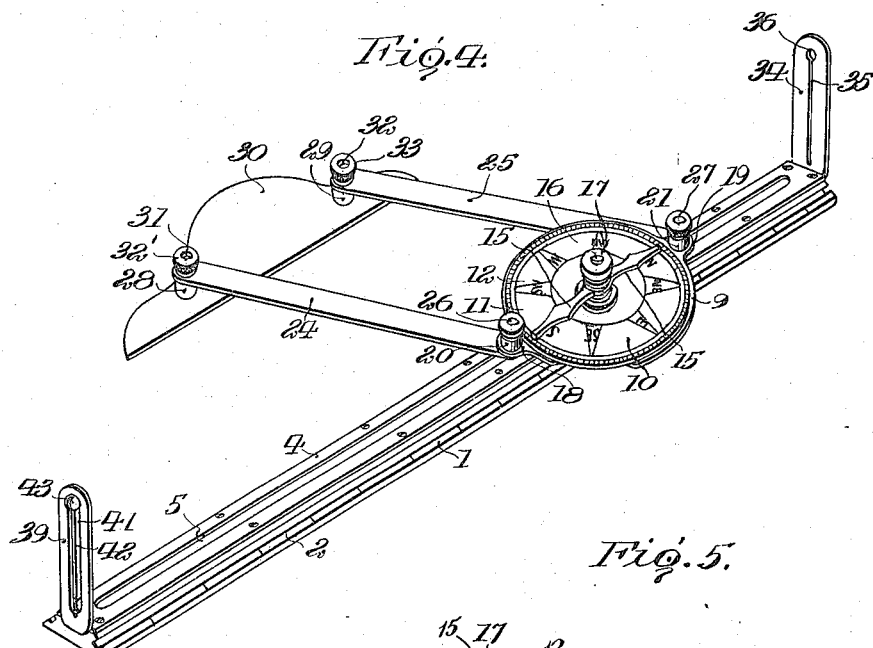
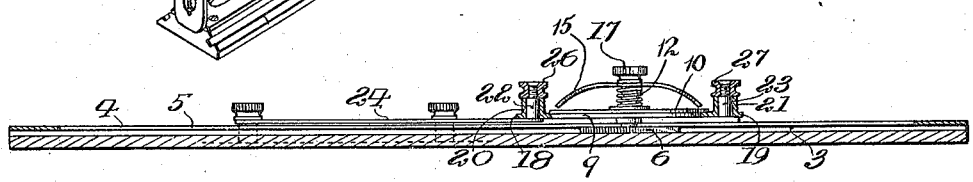
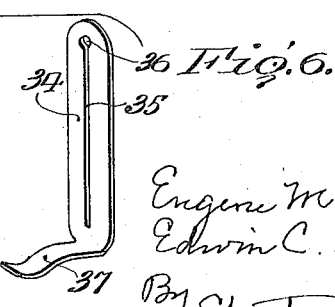

UNITED STATES PATENT OFFICE.

EDWIN C. DAVISON, OF BELLEVUE, AND EUGENE M. SHERMAN, OF SEATTLE, WASHINGTON; SAID DAVISON ASSIGNOR TO SAID SHERMAN.

COMPASS-PROTRACTOR.

1,161,625.

Specification of Letters Patent.

Patented Nov. 23, 1915.

Application filed June 17, 1914. Serial No. 845,641.

*To all whom it may concern:*

Be it known that we, EDWIN C. DAVISON and EUGENE M. SHERMAN, citizens of the United States, residing, respectively, at Bellevue and Seattle, in the county of King, State of Washington, have invented certain new and useful Improvements in Compass-Protractors, of which the following is a description, reference being had to the accompanying drawing and to the figures of reference marked thereon.

Our invention relates to improvements in compass or course protractors.

The instruments commonly used at present for determining a ship's course, from any position to a given point, or for the purpose of determining the bearings of surrounding objects on a chart, consist of the ordinary parallel rulers. The use of these parallel rulers requires a tedious operation, and, furthermore, the results obtained by the same are subjected to serious errors. In determining a ship's course from any position to a given point on the chart with parallel rulers, the operator is obliged to traverse the chart from the position of the vessel to the compass rose arranged on the chart or to a meridian and then it is necessary to calculate the magnetic course. In carrying or moving these parallel rulers across the chart, should the ruler slip, the result obtained would be erroneous and it would be necessary to go over the entire operation again, as there is no possible way of correcting it. Should the parallel ruler slip unobserved by the operator, and the course carried across the chart to the compass rose at the upper end, an erroneous course is indicated, which may result disastrously.

The object of our invention is to obviate the necessity of carrying the parallel ruler across the chart from the position of the vessel thereon to the compass rose, which will enable an inexperienced person to use our instrument and accurately find a ship's course from any position to a given point, without any possibility of a mistake.

Another object of our invention is to provide an instrument of this character, in which the ruler is placed on the course and the same is not moved therefrom in obtaining said course, thus greatly reducing the liability of a mistake being made.

A still further object of our invention is to provide, in combination with an instrument of this character, a bearing instrument from which the bearing of any object visible from the ship's position can be readily obtained.

Figure 1:
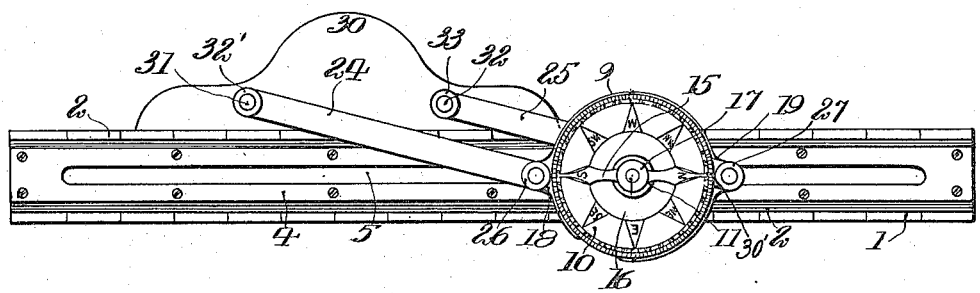
Figure 2:
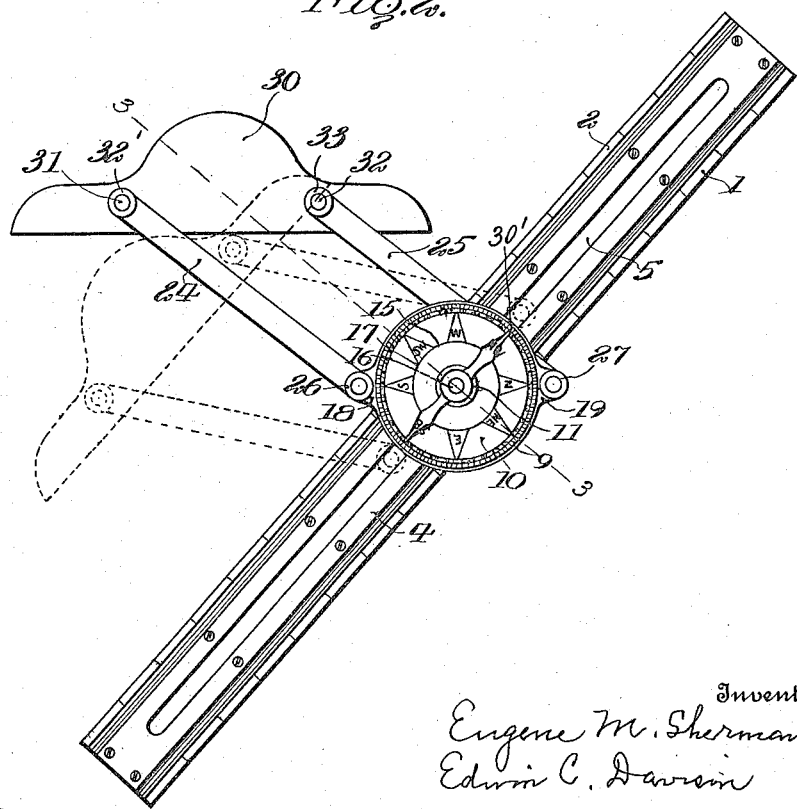

In the accompanying drawings, Figure 1 is a top plan view of our improved protractor in a folded position; Fig. 2 is a top plan view of the instrument when in use and showing the parts in a second position in dotted lines; Fig. 3 is a vertical transverse sectional view, taken on the line 3—3, Fig. 2; Fig. 4 is a perspective view of my instrument when used to find the bearing of any object from the ship; Fig. 5 is a longitudinal sectional view of Fig. 4; and Fig. 6 is a detached perspective view of the removable sighting members.

Referring now to the drawings, 1 represents a ruler which has a scale of inches and feet on its edges, as indicated at 2, for determining distances in miles between two points by comparison with the scale of miles, as marked on the chart. The ruler 1 is preferably made of wood and has in its upper face a longitudinal groove 3 extending the entire length thereof. Secured upon the upper face of the ruler is a metal plate 4, provided with a longitudinal slot 5, which is of a width less than that of the groove 3, and which extends nearly the entire length of the plate.

Within the groove 3, below the plate 4, is an elongated flat piece of metal 6, which accurately fits the sides of the groove 3, and yet is freely movable longitudinally. One object of the metal piece 6 is to guide and maintain the hand parallel with the ruler 1. Carried by the metal piece 6 is an upwardly extending rigid stud 7, which is of a cylindrical form and upon which is rotatably mounted the sleeve 8. Carried by the sleeve 8, at its lower end, is a disk 9, which rests upon the upwardly extending flange 4' of the plate 4, and said plate forming a turning bearing for the disk. Mounted upon the disk 9, and loosely surrounding the sleeve, is a compass dial 10, which is adapted to be turned upon the disk independent of the movement of the disk.

Surrounding the sleeve is a washer 11, which bears upon the upper face of the compass dial and has a coil spring 12 bearing upon it to frictionally hold the dial against free rotation on the disk. The upper end of the stud 7 is provided with a square or angular portion 13, which passes through a correspondingly shaped opening 14 in the compass hand 15. The said stud, above the squared portion, is provided with a threaded portion 16, upon which is secured a thumb nut 17, which forces the compass hand downwardly and locks it rigidly upon the upper end of the stud 7, so that the said hand always maintains its same parallel position in respect to the wooden ruler 1. The thumb nut 17, through the medium of the compass hand holds the spring 12 downwardly upon the washer 11, and thus the dial 10 is frictionally held upon the disk against free rotation.

The disk 9, as heretofore described, is rotatably mounted upon the stud 7, and is provided on opposite sides with ears 18 and 19. These ears are provided with upwardly extending bearing sleeves 20 and 21, in which are rotatably mounted the studs 22 and 23, carried by the links 24 and 25. The studs 22 and 23 have their upper ends threaded above the bearings or sleeves 20 and 21, and are provided with nuts 26 and 27, whereby the connection between the links and the disks is more secure to prevent wabbling of the links.

The outer ends of the links 24 and 25 are provided on their under faces with sleeves or bearings 28 and 29. The plate or ruler 30 is provided with upwardly extending lugs 31 and 32, which pass through the sleeves 28 and 29 and are provided with nuts 32' and 33 for locking the plate to the links 24 and 25. The lugs 31 and 32 are spaced apart a distance equal to the distance between the sleeves 20 and 21. The sleeves 28 and 29 being carried by the lower faces of the links, it will be seen that the plate or ruler 30 will be in the same horizontal plane with the ruler 1, so that they will rest flat upon the chart in laying off the course.

When using the instrument as a bearing finder, the sight 34 is placed in one end of the ruler 1. This sight comprises a body portion having a vertical slot 35 therein, and the upper end of said slot has an enlarged sighting opening 36. The lower end of the sight is provided with a lateral extension 37, having a slight crimp therein, and this extension is adapted to enter the groove 3 in the upper face of the ruler below the plate 4 and is frictionally held therein. The second sight 39 has the extension 40 constructed exactly like the extension 37, and its body portion is provided with an enlarged slot 41, having a wire 42 extending vertically across said slot and secured thereto by screws 43.

In operation the ruler 1 is placed on the desired course on the chart, one point being the ship and the second point any given point. The member 30 is then swung with its links on the ruler 1 to bring the same on any of the parallel, which are arranged on all charts. The compass dial 10 is then oscillated to bring the point designated north to register with the notch 30' on the disk 9. Said notch 30' is located on the periphery of the disk 9 opposite one of the ears 17 and 18. The hand 15 will then indicate the true course on the compass dial. If the magnetic course is desired, the dial is moved to bring north to the east or west of the notch, as the variations may be in that particular place. From this description, it will be seen that the ruler 1 is always held on the course and the member 30 is moved to oscillate the disk to bring the dial around, so that the hand 15 will designate the true course on the compass dial. The movement of the disk, as is readily understood, is caused by the movement of the links by the member 30 in bringing the said member upon the most convenient parallel on the chart.

When using the device as a bearing finder, the sights are placed in the end of the ruler 1, as heretofore described. If the ship is steering west by the compass, place west on the dial at the notch on the disk. Move the metal plate or rule 30 athwartship and take the sight at a lighthouse, or other object, and the hand 15 will indicate on the dial the magnetic bearing, it being understood that, in setting the dial, allowance should be made for any deviation of the magnetic compass on that particular course.

If more convenient to place metal plate or rule 30 fore and aft, then place west on the dial to the point marked 90 degrees from above said notch. The point to remember being that the dial on the instrument and the dial of the compass shall occupy the same relative position.

Having thus described our invention, what we claim as new and desire to secure by Letters Patent, is:—

1. A protractor, comprising a ruler, an oscillating compass dial mounted thereon, a stationary hand coöperating with said dial carried by the ruler, and a movable member connected to the dial and adapted to oscillate the same.

2. A protractor, comprising a ruler, an oscillating compass dial mounted thereon, a stationary hand coöperating with said dial carried by the ruler, a movable member, and a link connection between the movable member and dial.

3. A protractor comprising a ruler, an oscillating compass dial carried thereby, a stationary hand coöperating with said dial, a movable member and a double link connection between the movable member and the dial, whereby the dial is oscillated by the movement of said member.

4. A protractor, comprising a ruler, an oscillating disk mounted upon the ruler, a dial rotatably mounted upon said disk, a stationary hand coöperating with said dial, a second ruler and a link connection between the disk and second ruler.

5. A protractor, comprising a ruler, an oscillating disk mounted upon the ruler, a dial carried by the disk and adapted to be turned thereon, a stationary hand carried by the ruler above the dial, links connected to opposite sides of the disk, and a second ruler pivotally connected to the outer ends of said links.

6. A protractor, comprising a ruler, a stud carried by the ruler, a disk oscillating on said stud, a compass dial carried by the disk and adapted to be moved independent of the disk, a hand rigidly carried by the stud above the dial, links pivotally connected to the opposite sides of the disk, and a ruler pivotally connecting the outer ends of said links.

7. A protractor, comprising a ruler, a stud carried by the ruler, a disk oscillating on said stud, a compass dial carried by the disk and adapted to be oscillated thereon, a hand rigidly carried by the stud above the dial, links pivotally connected to opposite sides of the disk, and a ruler pivotally connected to the outer ends of the links and the pivots of the disk and ruler being equal distances apart.

8. A protractor, comprising a ruler, a stud carried by the ruler, a sleeve mounted upon the stud and adapted to oscillate thereon, a disk rigidly carried by the lower end of the sleeve, a compass dial loosely surrounding the sleeve and resting upon the disk, a hand rigidly carried by the upper end of the stud and extending parallel with the ruler, a spring surrounding the sleeve and frictionally holding the dial on the disk against rotation, links pivotally connected to opposite sides of the disk, and a ruler pivotally connecting the outer ends of said links.

9. A protractor, comprising a ruler, an oscillating compass dial carried thereby, a stationary hand carried by the ruler, a movable ruler and a link connection between the movable ruler and the dial for oscillating the same.

10. A protractor, comprising a ruler, a compass dial rotatably mounted upon the upper face of the ruler, a hand rigidly supported by the ruler, links pivotally connected to opposite sides of the dial, and a ruler pivotally connected to the free ends of the link having its lower face in the same plane as the lower face of the first mentioned ruler.

11. A protractor, comprising a ruler, a dial rotatably supported by the ruler and longitudinally movable thereon, a hand rigidly supported above the dial, links pivotally secured to opposite sides of the dial, downwardly extending sleeves carried by the outer ends of the links, and a ruler pivotally connected to the lower ends of the sleeves and having its lower face in the same plane as the lower face of the main ruler.

12. A protractor, comprising a ruler, a compass dial rotatably supported by the upper face of the ruler in a horizontal plane, a hand rigidly supported by the ruler above the dial, links pivotally secured to opposite sides of the dial, downwardly extending sleeves carried by the outer ends of the links, and a ruler having said sleeves pivotally connected thereto a distance apart equal to the distance between the pivotal connection of the links with the dial.

13. A protractor, comprising a ruler, a disk pivotally supported in a horizontal plane on the ruler, a compass dial mounted upon the upper face of the disk and adapted to oscillate thereon, a spring for frictionally holding the dial on the disk, a compass hand carried by the ruler, ears carried by the opposite sides of the disk, links pivotally connected to the ears, and a ruler pivotally connected to the outer ends of the links.

14. A protractor, comprising a ruler, a pivot carried thereby, a disk rotatably mounted upon the pivot, a compass dial rotatably mounted upon the pivot, a compass hand rigidly mounted upon the pivot of the disk and extending parallel with the ruler, a spring carried by the pivot for frictionally holding the dial on the disk, ears carried by opposite sides of the disk, links pivotally connected to the said ears, and a ruler pivotally connected to the outer free ends of the link, and having its lower face in a plane with the lower face of the first mentioned ruler.

In testimony whereof, we affix our signatures in the presence of two witnesses.

EDWIN C. DAVISON.
EUGENE M. SHERMAN.

Witnesses:
DANIEL L. PRATT,
L. K. COMINGS.

Copies of this patent may be obtained for five cents each, by addressing the "Commissioner of Patents, Washington, D. C."